F. DELAS.
TREE SAWING MACHINE.
APPLICATION FILED JUNE 21, 1917.
1,263,385.
Patented Apr. 23, 1918.
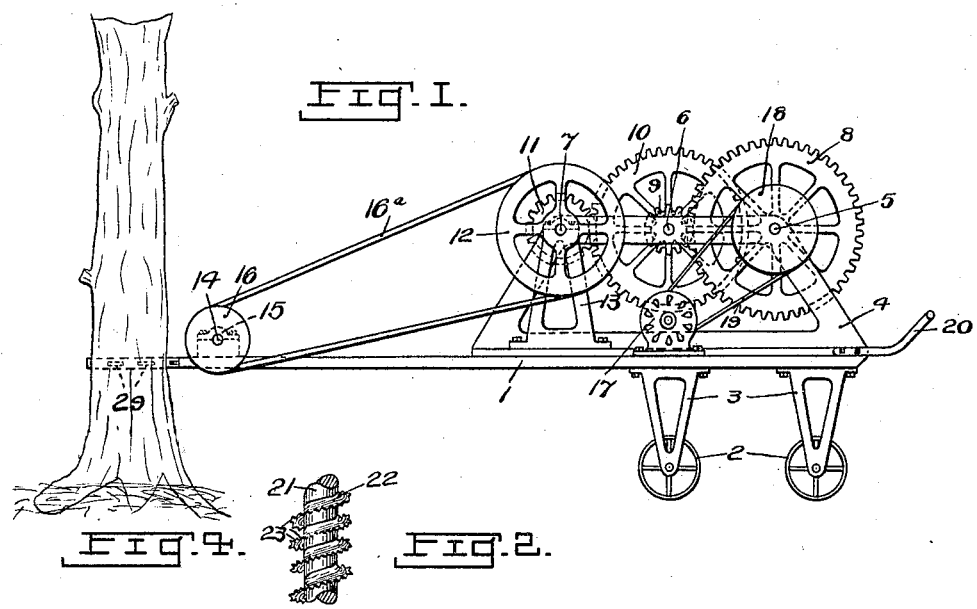
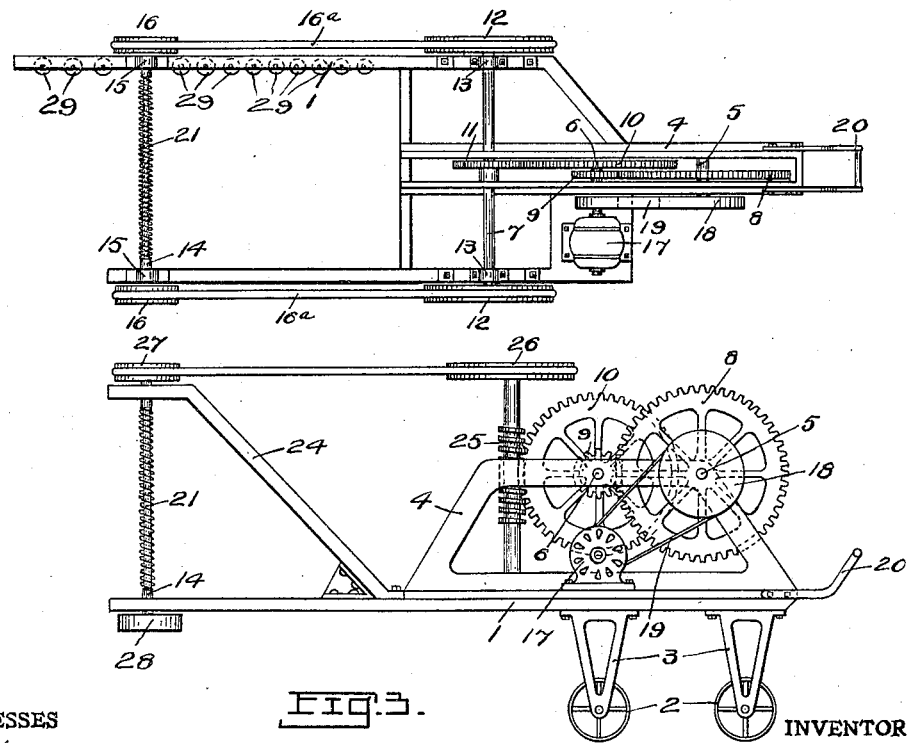
WITNESSES
C. Patenaude
A. P. Deal
INVENTOR
F. Delas.
By
Attorney.

UNITED STATES PATENT OFFICE.

FRANÇOIS DELAS, OF MONTREAL, QUEBEC, CANADA.

TREE-SAWING MACHINE.

1,263,385.   Specification of Letters Patent.   Patented Apr. 23, 1918.

Application filed June 21, 1917. Serial No. 176,119.

*To all whom it may concern:*

Be it known that I, FRANÇOIS DELAS, a citizen of France, residing at 278 Clark street, in the city of Montreal, in the Province of Quebec, in the Dominion of Canada, have invented certain new and useful Improvements in Tree-Sawing Machines; and I do hereby declare that the following is a full, clear, and exact description of the same.

The present invention relates to improvements in a tree sawing machine, and has for one of its objects to devise a machine for sawing standing trees, that will be simple in construction, cheap to manufacture, and especially easy to handle. By slightly modifying the construction of the machine, it can be made to cut trees lying in a horizontal position.

Another object of the invention is to provide a machine of this character, having a spiral saw which will be stronger than a band saw and will not be liable to break so easily.

The invention will be better understood with the aid of the accompanying drawings, in which Figure 1 is a side elevation of the machine in operation.

Fig. 2 is a top view of the machine.

Fig. 3 is a side elevation of a modification of the machine.

Fig. 4 is an enlarged perspective view of the saw.

Like numerals of reference designate corresponding parts in each figure.

In the drawings, 1 is a carriage, and 2 are wheels suitably journaled in brackets 3 which are secured under said carriage 1. 4 is a frame secured on said carriage 1, in which are journaled the shafts 5, 6 and 7, here shown as arranged horizontally and in parallel relation.

In order to multiply the revolutions of the driving motor 17, which is secured on the carriage, a gear 8 is mounted on the shaft 5 and meshes with a smaller gear 9 which is mounted on the shaft 6. 10 is a larger gear also mounted on the shaft 6, and adapted to engage a smaller gear 11 mounted on the shaft 7.

At opposite ends of the shaft 7 are mounted the pulleys 12, and 13 are brackets adjacent to said pulleys, adapted to support the outer ends of said shaft 7.

A shaft 14 is journaled in the bearings 15 at the front end of the carriage 1, and 16 are pulleys mounted on the ends of said shaft 14 in alinement with the pulleys 12. 16ª are belts connecting said pulleys 12 and 16.

The motor 17 is preferably secured on the carriage 1, preferably near the front wheels 2, in order that its weight may not be felt too much. Any other type of motor may be used, but an electric motor is here illustrated.

The pulley 18 is mounted on its shaft 5 and is driven by a belt 19 which is connected to the driving pulley on the motor 17.

A handle 20 is provided in the rear of the carriage in order to direct the machine.

On the shaft 14 is mounted, between the ends of the carriage frame, the horizontal spiral saw 21. This saw is very much like a drill; the spirals 22 have cutting edges 23 which will saw their way into the tree.

In the modification illustrated in Fig. 3 of the drawings, the carriage 1 is slightly altered, in that an upright frame 24 is provided in the front of the machine in which is journaled vertically the shaft 14 carrying the saw 21. As the position of the saw is vertical instead of horizontal, the gear 11 is replaced by the worm gear 25, on the spindle of which is mounted the horizontal pulley 26 which is connected to the horizontal pulley 27 mounted on the upper end of the shaft 14; and 28 is a fly wheel mounted on the lower end of said shaft 14.

With this modification in the machine, a felled tree in a horizontal position may be sawn just as effectively as in an upright position.

It will easily be understood that the gears 8, 9, 10 and 11 could be eliminated without departing from the spirit of the invention, as they serve only to increase the revolutions of the saws. The motor, also, could be connected directly to the shaft 14, if found suitable.

It is also clear that the spiral saw may be replaced by any other suitable sawing means, such as a band saw, or an articulated saw.

The carriage 1, as described in this specification, has an open front end, and one side of said carriage preferably projects outwardly in order to prevent the spiral saw 21 from carrying the carriage on one side. The inner side of said carriage, which will rest against the tree, is preferably provided with a series of rollers 29 in order to eliminate friction and facilitate the motion of the carriage.

What I claim is:—

In a sawing machine, the combination of a wheeled frame; a pair of vertical brackets mounted upon the rear portion thereof in spaced, parallel relation; front and rear transmission shafts journaled in said brackets; a motor mounted upon said carriage and connected to drive the rear transmission shaft; a gear train connecting said transmission shafts together; a rotary saw shaft rigidly supported upon the front end of said frame and adapted to be carried by said frame into position to operate upon the object to be sawed, said saw shaft having spirally-arranged cutting teeth; a shaft mounted upon said frame intermediate said saw shaft and the front transmission shaft; and an endless, flexible driving connection between said intermediate shaft and said saw shaft.

Signed at Montreal, Canada, this 22nd day of May 1917, at 9.30 a. m.

FRANÇOIS DELAS.

Witnesses:
 ELOY BOCUZ SELTZ,
 L. TERNY.

Copies of this patent may be obtained for five cents each, by addressing the "Commissioner of Patents, Washington, D. C."